US006455149B1

(12) United States Patent
Hagen et al.

(10) Patent No.: US 6,455,149 B1
(45) Date of Patent: Sep. 24, 2002

(54) PEAT PELLETS

(75) Inventors: Timothy S. Hagen, Superior, WI (US); Thomas J. Malterer, Duluth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/503,611

(22) Filed: Feb. 11, 2000

Related U.S. Application Data

(60) Provisional application No. 60/120,004, filed on Feb. 11, 1999.

(51) Int. Cl.$^7$ .................................................. B32B 5/16
(52) U.S. Cl. ........................ 428/323; 428/330; 428/337; 428/402; 71/24; 71/63; 71/64.13; 71/64.01
(58) Field of Search ................................ 428/402, 323, 428/330, 337; 71/24, 63, 64.13, 64.01

(56) References Cited

U.S. PATENT DOCUMENTS

| | | | |
|---|---|---|---|
| 2,019,824 A | 11/1935 | Liehr et al. ..................... 71/24 |
| 3,111,404 A | 11/1963 | Karcher et al. ................. 71/24 |
| 3,307,934 A | 3/1967 | Palmer et al. .................. 71/24 |
| 3,321,296 A | 5/1967 | Abbe .............................. 71/24 |
| 3,326,668 A | 6/1967 | Anthes et al. ................. 75/755 |
| 3,369,884 A | 2/1968 | Barron ........................... 71/28 |
| 3,617,237 A | 11/1971 | Nagasawa et al. .............. 71/24 |
| 3,645,714 A | 2/1972 | Heming et al. ................. 71/23 |
| 3,656,930 A | * 4/1972 | Martin |
| 3,844,759 A | 10/1974 | Ruel et al. ...................... 71/24 |
| 3,973,355 A | 8/1976 | McKenzie |
| 3,985,536 A | * 10/1976 | Abbe |
| 4,170,515 A | 10/1979 | Lalancette et al. ............. 162/92 |
| 4,174,957 A | 11/1979 | Webb et al. ..................... 71/24 |
| 4,318,248 A | 3/1982 | Muldner ........................ 47/56 |
| 4,404,013 A | 9/1983 | Rainbow |
| 4,424,645 A | 1/1984 | Rannali |
| 5,413,618 A | 5/1995 | Pennigsfeld et al. ........... 44/490 |
| 5,501,718 A | 3/1996 | Bandurski ........................ 71/9 |
| 5,749,934 A | 5/1998 | Parent et al. .................... 71/24 |
| 5,888,803 A | 3/1999 | Starkey .................... 435/254.1 |

FOREIGN PATENT DOCUMENTS

| | | |
|---|---|---|
| EP | 0 350 132 | 1/1990 |
| JP | HEI 2-77487 | 3/1990 |
| JP | 2 077 487 | 3/1990 |

OTHER PUBLICATIONS

California Pellet Mill Co., "Pellet Mills," Promotional Literature, 1 page (1997). No month.
Commercial and Industrial Davis Batch Mixers, "Model S–10 Ribbon Mixer," http://www.hcdavis.com/Commercial/Index.htm, 1 page, (available on–line as of Jan. 11, 1999).
Malterer et al., "Fiber Content and Degree of Decomposition in Peats: Review of National Methods," *Soil Sci. Am. J.*, 56:1200–1211 (1992). No month.
Material Safety Data Sheet, "Professional MWA Concentrate® Powder," Applied Environmental, Inc., 1 page (1996). No month.
Material Safety Data Sheet, "Professional MWA Concentrate® Liquid," Applied Environmental, Inc., 1 page (1997). No month.
Material Safety Data Sheet, "Starch–based Terra–Sorb," Plant Health Care, Inc., 2 pages (1997). No month.
"Pelleting and Grinding Seminar," Sep. 25, Roskamp Champion, California Pellet Mill Co., 7 pages (1997). No month.
"Standard Classification of Peats, Mosses, Humus, and Related Products," ASTM D 2607–69, *American Society for Testing and Materials*, p. 318 (1969). No month.
Product Data Sheet"Sta–Wet," Natural Absorbent Technologies Co., 2 pages (1997). No month.
Specification Sheet, "Terra–Sorb," Industrial Sciences International Promotional Literature, 1 page (1997). No month.

* cited by examiner

*Primary Examiner*—Leszek Kiliman
(74) *Attorney, Agent, or Firm*—Mueting, Raasch & Gebhardt, P.A.

(57) ABSTRACT

Water swellable pellets, and a method of making, including peat moss, a pH adjusting agent, a wetting agent, and optionally a processing additive, preferably with a bulk density of about 300 kg/m$^3$ to about 600 kg/m$^3$.

42 Claims, No Drawings

PEAT PELLETS

This application claims the benefit of U.S. Provisional Application No. 60/120,004, filed Feb. 11, 1999, which is incorporated herein by reference in its entirety.

FIELD OF THE INVENTION

This invention relates to pelletized peat moss that readily degranulates and expands to its original unpelletized (loose) state after contact with water.

BACKGROUND

The unique features of peat moss are well known. Peat moss is a combination of cellulose, lignin, humus acid, waxes, and resins. Peat moss leaves are one cell layer thick and are thin-walled with large cavities that readily absorb and hold water. Peat moss has high water retention and holding capacity, high buffering capacity, high cation exchange capacity, high organic matter, excellent aeration qualities, and high porosity. Clearly, these characteristics set it apart from competing products such as compost, coir, and others.

However, peat is not without its shortcomings. Peat moss is usually packaged in compressed bales at about 15 pound/foot$^3$ (15 lb/ft$^3$, 240 kg/m$^3$), and the relatively bulky bales take up considerable storage space. Peat moss is relatively non-free flowing. This makes the removal from the bale somewhat difficult, especially in greenhouses and container growing applications where substrate mixes are commonly prepared. In fact, bale busters have had to be specifically designed to open up compressed bales of peat moss.

Most types of loose peat moss are dusty and somewhat of a burden to use, especially in the small quantities typically used by garden hobbyists. It is common practice for these types of users to try to scoop peat moss from a compressed bale. In this situation the hobbyist is confronted with a hard-to-penetrate mass of packed peat moss, that when removed from the bag, generates significant dust. Workers handling peat often need to wear masks to prevent inhalation of dust particles.

In addition, baled or loose peat moss is difficult or nearly impossible to use in conventional lawn spreading fertilizer equipment. Loose peat moss bridges easily, causing void areas to form in the feed hopper above the spreader, thereby preventing the free flow of peat moss through the spreader. Although the free flow characteristics of peat moss can be improved by lowering its moisture content, it then becomes difficult to rewet and too dusty to use.

SUMMARY OF THE INVENTION

This invention provides water swellable pellets including peat moss, a pH adjusting agent, a wetting agent, and optionally a processing additive. Preferably, the pellets of this invention have a bulk density of about 300 kg/m$^3$ to about 600 kg/m$^3$.

This invention also provides a method for preparing water swellable peat moss pellets. The method includes: preparing a mixture including peat moss and a pH adjusting agent; extruding the mixture through a die to form pellets; and adding a wetting agent to the mixture prior to extruding and/or to the pellets after extruding. Preferably the die has a compression ratio of about 2 to about 4. In a preferred embodiment, the method is a continuous process for preparing peat pellets.

As used herein, "water swellable" means that the pellet has a pellet swell length (PSL) of greater than about 1.2. The "pellet swell length" is defined as the ratio of wetted pellet length to unwetted pellet length after the pellet has been saturated with water. The bulk density is defined as the weight of pellets (kg) required to fill a cubic meter of volume.

It should be understood that where incorporation of an ingredient is specified, either a single ingredient or a combination or mixture of materials may be used as desired. It should also be understood that the specification of a value that includes the term "about" is meant to include both higher and lower values reasonably close to the specified value. For many properties, values either 10% above or 10% below the specified value are intended to be included by use of the term "about".

DETAILED DESCRIPTION OF THE INVENTION

This invention provides peat moss pellets that readily degranulate and expand back to their original loose and fluffy peat moss state after contact with water. The pellets remain easily and instantaneously wettable after they are produced. Specifically, this invention identifies formulations for peat moss pellets that readily reexpand (degranulate) to a fluffy peat moss-state after wetting. After initial wetting and subsequent drying, the peat readily rewets.

The particle size of the pellets can vary depending on the application. Typical particle sizes are about 1.4 millimeter (mm) to about 4.0 mm for many applications. The bulk density of the pellets is typically at least about 19 pounds per cubic foot (lb/ft$^3$) (300 kilograms per cubic meter (kg/m$^3$)), preferably at least about 22 lb/ft$^3$ (350 kg/m$^3$), and more preferably at least about 25 lb/ft$^3$ (400 kg/m$^3$). The bulk density of the pellets is typically at most about 37 lb/ft$^3$ (600 kg/m$^3$), preferably at most about 31 lb/ft$^3$ (500 kg/m$^3$), and more preferably at most about 28 lb/ft$^3$ (450 kg/m$^3$). The pellets have good mechanical strength and contain little or no dust. The pellets have long shelf life as evidenced by their relatively stable functional properties (e.g., expansion in length or volume upon wetting) over a period of from about one month to about three months. The pellets are easily handled in bulk or bag form and are easily spread with conventional fertilizer spreading equipment. The pH of the pellets is typically at least about 5.5, preferably at least about 6.0, and more preferably at least about 6.5. The pH of the pellets is typically at most about 8.0, preferably at most about 7.5, and more preferably at most about 7.0.

Pellets can be produced by either batch or continuous methods. For example, a batch method may consist of a single compression stroke operation where the peat is compacted into molds using pressure, followed by removing the pellets produced from the molds. Although pellets can be produced by batch methods without substantial heat buildup, batch methods are labor and time intensive and are not cost effective methods for use in the production of commercial quantities of peat pellets. Continuous extrusion-based pelletizing methods are ideal methods for economically producing commercial quantities of peat pellets. However, extrusion methods suffer from significant buildup of heat that is produced in the extrusion process.

Pelletizing is a processes that utilizes compaction and extrusion to produce pellets. When material is forced through a die to produce pellets, frictional heat is imparted to the material being pelletized. In many cases this is a favorable situation, as the heat can activate some types of binders and increase their effectiveness. However, in the case of peat moss, frictional heat is an undesirable consequence of pelletizing. Heat activates the natural waxes and resins in the peat moss, thereby transforming the surface to essentially a hydrophobic, nonwettable state as evidenced by the small expansion in length and volume observed upon contact with water. The activated waxes act to waterproof the pellet, an undesirable result in the case of the peat pellets of this invention.

The ingredients used to make the peat pellets of this invention are often mixed with a commercially available solids mixer such as the Model S-10 Ribbon Mixer from H.C. Davis Sons Manufacturing Co., Inc. (Davis, Bonner Springs, Kans.). Although conditions may vary depending on the equipment being used and the materials being processed, the mixer is typically run at about 20 revolutions per minute (rpm) to about 30 rpm for about 5 minutes to about 10 minutes to adequately blend the ingredients. Alternatively, the ingredients can be added continuously to ports in a pellet mill with the mixing taking place during the pelletizing process.

The ingredients may then be converted to pellets using a commercially available pellet mill such as those available from California Pellet Mill Co. (CPM, Crawfordsville, Ind.). Although conditions may vary depending on the equipment being used and the materials being processed, the pellet mill is typically run at about 240 rpm with a feed rate of about 300 grams per minute (g/min) to extrude the mixture. The knives on the pellet mill can be set to produce pellets of the desired length. Typically the knives are set to produce pellets of about 0.25 inch (6 mm) to about 0.75 inch (19 mm).

The dies used in the pellet mill are often commercially available in a variety of sizes as indicated by hole size x effective thickness. The compression ratio (CR) is a term used to characterize a die, and it may be calculated by dividing the effective thickness of the die by the hole diameter. Commonly used dies for feed mills include those having a size of 0.156 inch×1.5 inch (3.97 mm×38.1 mm, CR=9.6), 0.156 inch×1.75 inch (3.97 mm×44.5 mm, CR=11.2), 0.156 inch×2 inch (3.97 mm×50.8 mm, CR=12.8), and 0.75 inch by 5 inch (19.1 mm×127 mm, CR=6.7). However, dies with lower compression ratios can be custom ordered from the manufacturers including those having a size of 0.25 inch×0.5 inch (6.35 mm×12.7 mm, CR=2) and 0.25 inch×1.5 inch (6.35 mm×38.1 mm, CR=6). Dies used to prepare the pellets of this invention typically have a compression ratio of at least about 2. Dies used to prepare the pellets of this invention typically have a compression ratio of at most about 4, preferably at most about 3, and more preferably at most about 2.5.

The pelletizing process may be carried out by mixing specific proportions of peat moss with any additives in the formulation (e.g., pH adjusting agents, wetting agents, processing additives, etc.) followed by densifying the mixture in a pellet mill. Typically the moisture content of the mixture (% by weight) is adjusted to at least about 25%. Typically the moisture content of the mixture (% by weight) is adjusted to at most about 45%, preferably at most about 35%, and more preferably at most about 30%.

The pellets produced are often used without further processing. However, for some applications it may be desirable to decrease the size of the pellets through a further process step. For example, the pellets produced may be crumbled using a roll crusher such as one available under the trade designation ROSKAMP from Roskamp Champion (Waterloo, Iowa). If desired, the pellets may also be screened to a desired size. The resulting pellets have unique and unexpected absorption properties including a high propensity to expand and break apart (degranulate) upon exposure to water.

Sphagnum is classified (ASTM D 2607-69) as containing a minimum of 66.7% sphagnum moss fiber by weight based on an oven dried sample. Sphagnum moss is commercially available from a variety of sources including FAFARD (Agawam, Mass.). Commercially available Sphagnum peat moss typically has a moisture content of about 35% by weight to about 55% by weight. The von Post Humification method as described in T. J. Malterer et al., *Soil Sci. Soc. Am. J.*, 56, 1200 (1992) is commonly used to characterize the degree of decomposition of Sphagnum peat moss. The Sphagnum peat moss used in this invention typically has a von Post number of at least about H2 and preferably at least about H3. The Sphagnum peat moss used in this invention typically has a von Post number of at most about H4 and less than 10% by weight ash. The Sphagnum peat moss may be screened prior to pelletizing to remove sticks and other unwanted material. Typically, a 0.25 inch (0.64 cm) screen may be used to remove sticks greater than about 0.25 inch (0.64 cm). The Sphagnum peat moss may also be air dried to the desired moisture content before further processing. Typically, the peat moss is air dried to a moisture content of about 20% by weight to about 30% by weight.

Additives are typically incorporated into the peat pellets of this invention to adjust the pH. The pH of Sphagnum moss and other peats is often very low, commonly less than 4. It is desirable for nearly all uses that the pH be adjusted to about 6 to about 7. Commonly used pH adjusting agents include, but are not limited to, calcium carbonate, calcium oxide, calcium hydroxide, magnesium oxide, magnesium carbonate, bentonite, and fly ash. Preferred pH adjusting agents include calcium carbonate, magnesium carbonate, and mixed calcium/magnesium carbonates (e.g., dolomite and dolomitic limestone). A particularly preferred pH adjusting agent is fine grade calcium carbonate with particle size of about 60 mesh to about 100 mesh such as the commercially available material from Iowa Limestone Co. (Des Moines, Iowa.). The amount of calcium carbonate or other pH adjusting amounts needed to adjust the pH to the desired level will depend on the initial pH of the peat moss used. However, for commonly used types of peat moss, calcium carbonate or other pH adjusting agent is typically added in an amount of about 14 lb/yd$^3$ (8 kg/m$^3$) of screened peat to about 27 lb/yd$^3$ (16 kg/m$^3$) of screened peat (i.e., peat moss passed through a 0.25 inch (0.64 cm) screen) to adjust the pH to about 6 to about 7.

Wetting agents are typically incorporated into the peat pellets of this invention. Wetting agents function to improve the wetting properties of the resulting peat pellets. Nonionic surfactants are commonly incorporated as wetting agents. For example, copolymerized alkane oxides may be used such as the proprietary copolymerized alkane oxide surfactant or wetting agent commercially available under the trade designation PROFESSIONAL MWA CONCENTRATE from Applied Environmental, Inc. (Tabernacle, N.J.) either in liquid or powder form. Wetting agents are typically added in an amount of at least about 4 ounces per cubic yard (oz/yd$^3$) (150 grams per cubic meter (g/m$^3$) of screened peat and preferably at least about 4.5 oz/yd$^3$ (170 g/m$^3$) of screened peat. Wetting agents are typically added in an amount of at most about 6 oz/yd$^3$ (220 g/m$^3$) of screened peat and preferably at most about 5.5 oz/yd$^3$ (200 g/m$^3$) of screened peat. The wetting agent may be incorporated at any point during the pelletizing process. Commonly, at least a portion of the wetting agent is incorporated into the mixture of the ingredients being pelletized. However, a portion or all of the wetting agent may be applied to the pellets after they are produced.

Processing additives may also be incorporated into the peat pellets of this invention. For example, additives may be incorporated to reduce the friction encountered in the pelletizing process. Such additives include, but are not limited to, starch grafted copolymers such as the absorption dressing commercially available under the trade designation STA-WET from Natural Absorbent Technology (Smelterville, Id.), starch crosslinked with acrylonitrile such as that commercially available under the trade designation TERRA-SORB from Industrial Services International (Bradenton, Fla.), calcium lignosulfonate (Lignotech USA, Rothschild, Wis.), magnesium stearate (Mallinkrodt Chemical, Inc., St. Louis, Mo.), bentonite (Iowa Limestone Co., Des Moines, Iowa.), and ballclay. Preferred frictional relief agents include the carbohydrate-based additives that provide frictional relief at the pelletizing mill die. A particularly preferred carbohydrate-based frictional relief agent is STA-WET starch grafted copolymer. Frictional relief agents are generally incorporated at the lowest effective level to minimize raw material costs. When such frictional relief agents are incorporated, they are typically incorporated in an amount of at least about 1% by weight based on the weight of screened peat. When such processing additives are incorporated, they are typically incorporated in an amount of at most about 5% by weight and preferably at most about 3% by weight based on the weight of screened peat.

The incorporation of polymeric additives into peat pellets may tend to stabilize the swelling properties of the pellets over time. Selective incorporation of these additives may also allow the rate of swelling to be controlled for specific applications. For example, some turf applications require pellets that expand and break open immediately to provide an immediate burst of organic matter to the soil. Other applications require pellets that slowly expand, resulting in a slower release. Tailoring of these controlled release properties may be important when the pellets are used in carrier applications for additives such as herbicides, inoculants, and pesticides. Suitable polymeric additives include, but are not limited to, the carbohydrate-based processing additives described above.

Other functional or nonfunctional additives may be incorporated into the peat pellets of this invention. Typically, it may be desired to use the peat as a carrier for active ingredients to be delivered when the pellet expands upon contact with water. For example, organic and/or inorganic fertilizers may be incorporated into the pellets to provide fertilizer functionality. Examples of other functional additives include blood meal, bone meal, feather meal, chemical fertilizers, herbicides, fungicides, and pesticides. Other additives may also be incorporated into the pellets (e.g., flow agents, etc.) that do not effect the end use properties of the peat pellets. Examples of such additives include dyes that may be incorporated to alter the color of the pellets.

The pellets of this invention may be characterized by physical properties including pellet crush strength, pellet swell length (PSL), evidence of palpable mass, expansion coefficient, abrasion resistance, and pH.

Pellet crush strength may be ascertained by placing a single pellet in a compression tester commercially available under the trade designation CHATILLON Model DPP and applying sufficient downward force until the pellet fractures. Ten pellets, 0.25 inch (6.35 mm) in diameter by 0.25 inch (6.35 mm) in length are tested and the average force in pounds (or kilograms) needed to fracture the pellet is reported. The pellets of this invention typically have crush strengths of at least about 2.2 lb (1 kg). For some applications it is desirable that the pellets of this invention have crush strengths of at most about 6.6 lb (3 kg), preferably at most about 4.4 lb (2 kg), and more preferably at most about 3.3 lb (1.5 kg).

The pellet swell length (PSL) is the proportion of swell expressed as a ratio of wetted pellet length to unwetted pellet length after being saturated with water. PSL can be measured by placing a pellet into a half round cylinder to aid in allowing the pellet to expand about its length. Water may be added dropwise with an eye dropper so that visual saturation is achieved. The original length, the expanded length at one minute, and the expanded length at five minutes are recorded. PSL tests are conducted daily throughout a period of ten days and any loss in PSL throughout the ten day test period is noted.

The pellets of this invention typically have PSL measured at one minute of at least about 1.75, preferably at least about 2.5, and more preferably at least about 3.0. The pellets of this invention typically have PSL measured at five minutes of at least about 1.75, preferably at least about 2.5, and more preferably at least about 3.0. The ratio of the PSL measured at one minute to the PSL measured at five minutes for pellets of this invention is typically at least about 0.5, preferably at least about 0.75, and more preferably at least about 0.9. After ten days, the pellets of this invention typically show a percent loss in PSL measured at one minute of at most about 50%, preferably at most about 10%, more preferably at most about 1%. After ten days, the pellets of this invention typically show a percent loss in PSL measured at five minutes of at most about 50%, preferably at most about 10%, more preferably at most about 1%.

Evidence of a palpable or nonpalpable mass may be determined for the pellets of this invention. Palpable mass is defined as the state in which a significant amount of residue of the granule is hard to the touch when squeezed between the thumb and forefinger after taking on water. A nonpalpable mass is defined as the state in which substantially all of the residue of the granule is soft to the touch when squeezed between the thumb and forefinger after taking on water. Preferably, the pellets of this invention do not show evidence of a palpable mass.

The expansion coefficient for the pellets of this invention relates to the increase in volume as a result of wetting and is expressed as a ratio of the wetted volume to the original unwetted volume. This test is conducted by taking a three tablespoon (45 cm$^3$) sample of the unwetted peat moss pellets and placing it in a compact pile on a flat surface. With the aid of a squeeze bottle, a water stream is then impinged onto the sample until visual saturation is achieved. After five minutes the wetted volume is then measured by transferring the expanded, wetted peat moss into the tablespoon, scraping off the excess, and dumping the sample upside down onto a flat surface. This process is repeated through as many cycles as it takes to measure the total wetted expanded volume. Any evidence of a palpable mass is so noted. Typically, the pellets of this invention have an expansion coefficient of at least about 2, preferably at least about 3, and more preferably at least about 4.

The pH of the pellets of this invention can be measured by placing three grams of peat granules into 50 milliliters of deionized water, stirring for 30 minutes or until sufficient dissolution occurs, and measuring the pH with a standard pH probe.

The peat moss pellets of this invention can be utilized in many applications. Pellets of this invention are easily poured into small containers or growing pots. After watering, the pellets of this invention expand to about three to about four times their original volume. The resulting fluffy loose peat moss state is ideal for planting flowers or seeds.

The pellets of this invention are eminently suitable for use in conventional fertilizer equipment due to their free flowing characteristics. When fertilizers are spread with mechanical spreaders, they are subjected to a relatively high degree of abrasion and mechanical shock. Crumbled pellets can withstand these types of forces better than loose peat moss because of greater crush strength, abrasion resistance, and impact resistance. These properties make the pellets of this invention useful for the lawn maintenance market. Loose peat moss has not been successfully sold into the lawn maintenance market because of the difficulty encountered in application. Application of loose peat moss requires breaking open compressed bales and manually spreading the peat moss with a rake, a labor intensive process. The peat pellets of this invention are spreadable over lawn surfaces with conventional broadcast and drop spreaders. As the pellets take on water, they expand and break apart, thereby covering more area with less effort. The lawn receives a burst of organic matter (peat moss) that holds and retains nutrients near the rooting zone where it is most useful. A volume benefit is also realized. A two cubic foot bag of crumbled pellets expands nominally to about three times its volume after being watered, resulting in about six cubic feet of loose peat moss material.

The peat pellets of this invention are beneficial to plant growth when used as soil additives or plant growing substrates. The pellets are ideal for all horticultural, turf, and soil applications in which peat may be used. Additives may also be incorporated into the pellets to provide additional benefits. For example, organic and/or inorganic fertilizers may be added to the pellets to enable the pellets to function as a fertilizer source.

The present invention is illustrated by the following examples. It is to be understood that the particular examples, materials, amounts, and procedures are to be interpreted broadly in accordance with the scope and spirit of the invention as set forth herein, and are not intended to limit the invention in any way.

EXAMPLES

Sphagnum peat moss (as classified by ASTM D-2607-69) was obtained from FAFARD (Agawam, Mass.). The Sphagnum peat moss had a von Post decomposition number of H4 as measured by the procedure described in T. J. Malterer et al., *Soil Sci. Soc. Am. J.*, 56 1200 (1992). The inherent water content (% by weight) of the peat moss was determined by measuring the moisture loss upon heating the sample at 105° C. until constant weight was achieved. Fine grade calcium carbonate was obtained from Iowa Limestone Co. (Des Moines, Iowa.). PROFESSIONAL MWA CONCENTRATE Liquid and PROFESSIONAL MWA CONCENTRATE Powder are proprietary copolymerized alkane oxide surfactants or wetting agents commercially available from Applied Environmental, Inc. (Tabernacle, N.J.). STA-WET absorption dressing is a starch grafted polymer commercially available from Natural Absorbent Technology (Smelterville, Id.). Water used was ordinary tap water.

The physical properties of the pellets prepared in the following examples were characterized by the previously described methods. The PSL values reported represent the average values calculated from five replicates.

The peat moss pellets of the following examples were prepared by the following general procedure:

1. Sphagnum peat moss with decomposition of H4 or less (von Post Scale) was air dried to a moisture content of 20 to 30% by weight and then screened to remove sticks greater than 0.25 inch (0.64 cm).

2. Calcium carbonate was added to the screened peat moss in the amount of 14 lb/yd$^3$ (8.3 kg/m$^3$) of screened peat moss to adjust the pH to approximately between 6.5 and 7.0.

3. STA-WET starch grafted polymer, if used, was added to the above mixture in the amount of 45 oz/yd$^3$ (1.67 kg/m$^3$) of screened peat moss to provide frictional relief at the die on the pellet mill.

4. PROFESSIONAL MWA CONCENTRATE Liquid wetting agent was added to the above mixture in the amount of 5 oz/yd$^3$ (186 g/m$^3$) of screened peat moss as an aqueous solution containing enough water to bring the moisture content of the mixture up to the desired level.

5. These components were mixed together uniformly and fed to a pelletizing mill with a compression ration (CR) of from 2 to 4.

6. After exiting the pellet mill, the material was cooled and bagged.

Example 1

This example illustrates a preparation of peat pellets using 34% mix moisture by weight and low compression conditions using the following formulation:

| Ingredient | Grams Used |
| --- | --- |
| Sphagnum Peat moss with 30% inherent water | 4540 |
| Peat moss Solids (3178) | |
| Inherent Water in Peat moss (1362) | |
| Calcium Carbonate | 303 |
| Copolymerized Alkane Oxide | 5.2 |
| Water Added to Adjust Mix Moisture to 34% by weight | 433 |
| Total Grams of Mixture | 5281 |

The Sphagnum peat moss and calcium carbonate were mixed for a period of ten minutes, and the water and wetting agent were applied during the mixing. The mixture was then pelletized in a California Pellet Mill Co. (CPM) Model CL-3 pellet mill (commercially available from CPM, Crawfordsville, Ind.) using a 0.25 inch×0.50 inch (6.35 mm×12.7 mm) (CR=2) laboratory die with the knives set to produce 0.25 inch×0.25 inch (6.35 mm×6.35 mm) pellets. The pellets were then cooled at ambient temperature, after which they were stored in zip-lock plastic bags.

Pellets produced with the above formulation were characterized for pellet swell length (PSL), average crush strength, and volume expansion (expansion coefficient). Evidence of a palpable mass was so noted. The results are listed in Table 1.

TABLE 1

| Strength and Wetting Characteristics | |
| --- | --- |
| PSL after 1 minute exposure to water | 2.28 |
| PSL after 5 minute exposure to water | 2.55 |
| Average Crush Strength | 3.85 lb (1.75 kg) |
| Expansion Coefficient (Volume) | 3.50 |
| Evidence of palpable mass | None |

These results show that pellets made using the above formulation expanded 2.55 times in length after a five minute wetting period. Most of the swelling (89% of the recorded PSL) happened during the first minute of wetting.

This indicates that moisture penetration into the pellet happened quickly and in an unhindered manner, thereby allowing the compressed thin-walled Sphagnum moss cells to reabsorb water and expand. It is postulated that as the pellet rewetted, a shear plane accompanied the wetting front, whereby the thin walled Sphagnum moss cells on the wetted side of the plane swelled appreciably compared to the dry side of the plane. The resulting shear plane that accompanied the wetting front may have provided the driving force for the expansion to occur. Furthermore, the forces encountered in the shear plane might have been great enough to break open the pellet, allowing it to become completely rewetted and return to a natural expanded state having no palpably firm core.

Another noteworthy aspect of the pellets produced in this example is the large expansion coefficient. These pellets expanded to 3.5 times their dry volume after wetting. This means that if initially there is 1 cubic feet ($ft^3$) (0.028 cubic meters ($m^3$)) of pellets, there would be 3.5 $ft^3$ (0.098 $m^3$) of natural fluffy peat moss after rewetting. The large volume expansion upon wetting is a desirable property for the bulk transport of the pellets to overseas markets where bulk volume-based shipments are common. Additionally, the pellets are sufficiently hard to be handled and shipped with minimal breakage. Generally, pellets with a crush strength of less than about 2.5 lb (1.14 kg) are too weak for good handling. Pellets made with this formulation had average crush strength of 3.85 lb (1.75 kg).

Example 2

This example illustrates a preparation of peat pellets using 31% mix moisture by weight and low compression conditions using the following formulation:

| Ingredient | Grams Used |
| --- | --- |
| Sphagnum Peat moss with 30% inherent water | 4540 |
| Peat moss Solids (3178) | |
| Inherent Water in Peat moss (1362) | |
| Calcium Carbonate | 303 |
| Copolymerized Alkane Oxide | 5.2 |
| Water Added to Adjust Mix Moisture to 31% by weight | 204 |
| Total Grams of Mixture | 5052 |

The Sphagnum peat moss and calcium carbonate were mixed for a period of ten minutes, and the water and wetting agent were applied during the mixing. The mixture was then pelletized in a pellet mill (CPM Model CL-3) using a 0.25 inch×0.50 inch (6.35 mm×12.7 mm) (CR=2) laboratory die with the knives set to produce 0.25 inch×0.25 inch (6.35 mm×6.35 mm) pellets. The pellets were then cooled at ambient temperature, after which they were stored in zip-lock plastic bags.

Pellets produced with the above formulation were characterized for pellet swell length (PSL), average crush strength, and volume expansion (expansion coefficient). Evidence of a palpable mass was so noted. The results are listed in Table 2.

TABLE 2

Strength and Wetting Characteristics

| | |
| --- | --- |
| PSL after 1 minute exposure to water | 2.54 |
| PSL after 5 minute exposure to water | 2.70 |
| Average Crush Strength | 20.2 lb (9.2 kg) |
| Expansion Coefficient (Volume) | 3.60 |
| Evidence of palpable mass | None |

These results show that slightly greater PSL and much greater crush strength values were realized by lowering the mix moisture to 31% by weight instead of 34% by weight as in Example 1. In addition, 94% of the PSL happened in the first minute of wetting. Although there were only slight differences in the PSL values between Examples 1 and 2, a large difference in pellet crush strengths was observed. It is believed that the increase in crush strength was caused by having less frictional relief at the peat moss-die interface, with greater friction being encountered when less water was added to the mix (204 grams vs 433 grams). This may have caused more heat to be generated at the die, in turn causing greater densification. Activation of some of the natural waxes and resins (binders) in the peat moss may have given rise to the shiny hard-surfaced pellet that was observed.

Although these pellets were much harder, water was still able to penetrate the pellet and overcome the natural binding action of the waxes and resins. The forces encountered at the shear plane were still great enough to break open the pellet and allow it to return to a natural expanded state having no palpably firm core. It is believed that by using a low compression ratio die (CR=2), minimal frictional heat was imparted to the peat moss and the force of wetting was still able to break the pellet apart.

Comparative Example 1

This example illustrates a preparation of peat pellets using 31% mix moisture by weight and high compression conditions using the following formulation:

| Ingredient | Grams Used |
| --- | --- |
| Sphagnum Peat moss with 30% inherent water | 4540 |
| Peat moss Solids (3178) | |
| Inherent Water in Peat moss (1362) | |
| Calcium Carbonate | 303 |
| Copolymerized Alkane Oxide | 5.2 |
| Water Added to Adjust Mix Moisture to 31% by weight | 204 |
| Total Grams of Mixture | 5052 |

The Sphagnum peat moss and calcium carbonate were mixed for a period of ten minutes, and the water and wetting agent were applied during the mixing. The mixture was then pelletized in a pellet mill (CPM Model CL-3) using a 0.25 inch×1.50 inch (6.35 mm×38.1 mm) (CR=6) laboratory die with the knives set to produce 0.25 inch×0.25 inch (6.35 mm×6.35 mm) pellets. The pellets were then cooled at ambient temperature, after which they were stored in zip-lock plastic bags.

Pellets produced with the above formulation were characterized for pellet swell length (PSL), average crush strength, and volume expansion (expansion coefficient). The results are listed in Table C1.

TABLE C1

Strength and Wetting Characteristics

| | |
|---|---|
| PSL after 1 minute exposure to water | 1.02 |
| PSL after 5 minute exposure to water | 1.04 |
| Average Crush Strength | >25 lb (>11.4 kg) |
| Expansion Coefficient (Volume) | 1.1 |
| Evidence of palpable mass | YES |

The measured PSL values were only slightly greater than unity for both the one and five minute wetting period in this example using a high compression ratio die. It is postulated that moisture penetration into the pellet happened very slowly and in a hindered manner because the thin-walled Sphagnum moss cells were compressed beyond return and could not reabsorb water and expand. It is further postulated that the forces encountered in the shear plane were not great enough to break open the pellet and still overcome the heat activated binders in the peat moss. The pellets did not return to a natural expanded state and still had a firm core in the allotted five minute wetting period. These pellets remained hard with a detectable firm core even after immersion in water for several weeks.

The friction encountered with the use of this die may have caused the natural waxes and resins in the peat moss to become activated, causing the surface of the peat moss to become hydrophobic.

Example 3

This example illustrates a preparation of peat pellets using 25% mix moisture by weight, low compression conditions, and with the addition of a polymeric additive as shown in the following formula:

| Ingredient | Grams Used |
|---|---|
| Sphagnum Peat moss with 25% inherent water | 4540 |
| Peat moss Solids (3405) | |
| Inherent Water in Peat moss (1135) | |
| Calcium Carbonate | 303 |
| Copolymerized Alkane Oxide | 5.2 |
| Water Added to Adjust Mix Moisture to 25% by weight | 148 |
| Starch Grafted Polymer | 136 |
| Total Grams of Mixture | 5132 |

The Sphagnum peat moss and calcium carbonate were mixed for a period of ten minutes, and the water and wetting agent were applied during the mixing. The mixture was then pelletized in a pellet mill (CPM Model CL-3) using a 0.25 inch×0.50 inch (6.35 mm×12.7 mm) (CR=2) laboratory die with the knives set to produce 0.25 inch×0.25 inch (6.35 mm×6.35 mm) pellets. The pellets were then cooled at ambient temperature, after which they were stored in ziplock plastic bags.

Pellets produced with the above formulation were characterized for pellet swell length (PSL), average crush strength, and volume expansion (expansion coefficient). Evidence of a palpable mass was so noted. The results are listed in Table 3.

TABLE 3

Strength and Wetting Characteristics

| | |
|---|---|
| PSL after 1 minute exposure to water | 2.48 |
| PSL after 5 minute exposure to water | 2.59 |
| Average Crush Strength | 3.90 lb (1.77 kg) |
| Expansion Coefficient (Volume) | 3.50 |
| Evidence of palpable mass | None |

By reducing the mix moisture to 25% by weight and by incorporating a starch grafted polymer, a high degree of frictional relief at the die was realized. It is believed that frictional relief at the die is desirable to reduce heat activation of the natural waxes and resins in the peat moss. Examples 1 and 2 showed pellet crush strength of 3.85 lb (1.75 kg) at 34% by weight mix moisture and 20.2 lb (9.2 kg) at 31% by weight mix moisture. This example incorporated a starch grafted polymer into the mix and resulted in a crush strength of 3.9 lb (1.77 kg), and 96% of the PSL happened in the first minute of wetting. No net loss in PSL was noted throughout a ten day test period.

Without the incorporation of the polymer, the pellets lost up to 40% of their PSL 10 days after they were produced. Table 4 illustrates this loss throughout a ten day test period.

TABLE 4

A comparison showing the differences in how peat moss pellets from Examples 1, 2 and 3 lose their ability to swell about their length (PSL) when wetted.

| Days From When Pellets First Made | Example 1 Formulation: 34% Mix Moisture by weight | | Example 2 Formulation: 31% Mix Moisture by weight | | Example 3 Formulation: 25% Mix Moisture by weight +136 grams polymer | |
|---|---|---|---|---|---|---|
| | 1 Min PSL | 5 Min PSL | 1 Min PSL | 5 Min PSL | 1 Min PSL | 5 Min PSL |
| 2 | 2.28 | 2.55 | 2.54 | 2.70 | 2.48 | 2.59 |
| 3 | 1.89 | 2.33 | 2.28 | 2.72 | — | — |
| 4 | 1.57 | 2.00 | 2.06 | 2.68 | 2.45 | 2.54 |
| 7 | 1.39 | 1.66 | 1.92 | 2.61 | — | — |
| 8 | 1.37 | 1.54 | 1.88 | 2.56 | 2.59 | 2.68 |
| 10 | — | — | 1.82 | 2.53 | 2.52 | 2.64 |
| Average Percent Loss in PSL | 40% Loss | 40% Loss | 28% Loss | 17% Loss | Remains Stable | Remains Stable |

These results show that the polymer stabilized the PSL through a random ten day test period.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A water swellable pellet comprising peat moss, a pH adjusting agent, and a wetting agent.

2. The pellet of claim 1 having a bulk density of about 300 kg/m$^3$ to about 600 kg/m$^3$.

3. The pellet of claim 2 wherein said pH adjusting agent is selected from the group consisting of calcium carbonate, magnesium carbonate, and mixed calcium/magnesium carbonates.

4. The pellet of claim 2 wherein said pH adjusting agent is incorporated in an amount of at least about 8 kg/m$^3$ of screened peat moss.

5. The pellet of claim 2 wherein said wetting agent is a nonionic surfactant.

6. The pellet of claim 5 wherein said wetting agent is a copolymerized alkane oxide surfactant.

7. The pellet of claim 2 wherein said wetting agent is incorporated in an amount of at least about 150 g/m$^3$ of screened peat moss.

8. The pellet of claim 2 wherein said peat moss is Sphagnum peat moss.

9. The pellet of claim 8 wherein said peat moss has a von Post Humification number of about H4 or less.

10. The pellet of claim 2 further comprising a processing additive.

11. The pellet of claim 10 wherein said processing additive is a carbohydrate-based additive.

12. The pellet of claim 11 wherein said processing additive is a starch grafted copolymer.

13. The pellet of claim 10 wherein said processing additive is incorporated in an amount of at least about 1% by weight based on the weight of screened peat.

14. The pellet of claim 2 wherein the pH is about 6 to about 7.

15. The pellet of claim 2 having a pellet swell length measured at one minute of at least about 1.75 with no palpable mass detected.

16. The pellet of claim 15 having a ratio of pellet swell length measured at one minute to pellet swell length measured at five minutes of at least about 0.5.

17. The pellet of claim 2 having a volume expansion coefficient of at least about 2.

18. The pellet of claim 2 having a crush strength of at least about 1 kg.

19. A method for preparing a water swellable pellet, the method comprising:
  preparing a mixture comprising peat moss and a pH adjusting agent;
  extruding said mixture through a die to form pellets; and
  adding a wetting agent to the mixture prior to extruding and/or to the pellets after extruding.

20. The method of claim 19 wherein said die has a compression ratio of about 2 to about 4.

21. The method of claim 19 that is a continuous process for preparing pellets.

22. The method of claim 19 wherein said pH adjusting agent is selected from the group consisting of calcium carbonate, magnesium carbonate, and mixed calcium/magnesium carbonates.

23. The method of claim 19 wherein said pH adjusting agent is incorporated in an amount of at least about 8 kg/m$^3$ of screened peat moss.

24. The method of claim 19 wherein said wetting agent is a nonionic surfactant.

25. The method of claim 24 wherein said wetting agent is a copolymerized alkane oxide.

26. The method of claim 19 wherein said wetting agent is incorporated in an amount of at least about 150 g/m$^3$ of screened peat moss.

27. The method of claim 19 wherein said peat moss is Sphagnum peat moss.

28. The method of claim 19 wherein said peat moss has a von Post Humification number of about H4 or less.

29. The method of claim 19 wherein said mixture further comprises a processing additive.

30. The method of claim 29 wherein said processing additive is a carbohydrate-based additive.

31. The method of claim 30 wherein said processing additive is a starch grafted copolymer.

32. The method of claim 29 wherein said processing additive is incorporated in an amount of at least about 1% by weight based on the weight of screened peat.

33. A water swellable pellet prepared by a process comprising:
  preparing a mixture comprising peat moss and a pH adjusting agent;
  extruding said mixture through a die to form pellets; and
  adding a wetting agent to the mixture prior to extruding and/or to the pellets after extruding.

34. The pellet of claim 33 wherein said die has a compression ratio of about 2 to about 4.

35. The pellet of claim 34 wherein said process is a continuous method for preparing pellets.

36. A method for preparing a crumbled, water swellable pellet, the method comprising:
  preparing a mixture comprising peat moss and a pH adjusting agent;
  extruding said mixture through a die to form pellets;
  crumbling said pellets; and
  adding a wetting agent to the mixture prior to extruding and/or to the pellets after extruding or after crumbling.

37. A method for applying organic matter to a lawn, the method comprising applying a water swellable pellet comprising peat moss, a pH adjusting agent, and a wetting agent to the lawn.

38. The method of claim 37, wherein applying a water swellable pellet further comprises applying the pellet with a broadcast spreader or a drop spreader.

39. The method of claim 38, wherein the pellet is a crumbled pellet.

40. The method of claim 37 further comprising preparing the water swellable pellet by a method comprising:
  preparing a mixture comprising peat moss and a pH adjusting agent;
  extruding said mixture through a die to form pellets; and
  adding a wetting agent to the mixture prior to extruding and/or to the pellets after extruding.

41. A method for providing organic matter to a plant, the method comprising providing a water swellable pellet comprising peat moss, a pH adjusting agent, and a wetting agent to the plant.

42. The method of claim 41, wherein providing the pellet comprises applying the pellet to the plant growing substrate.

* * * * *